No. 851,417. PATENTED APR. 23, 1907.
J. HEINRICHS.
COFFEE URN.
APPLICATION FILED JAN. 15, 1904.
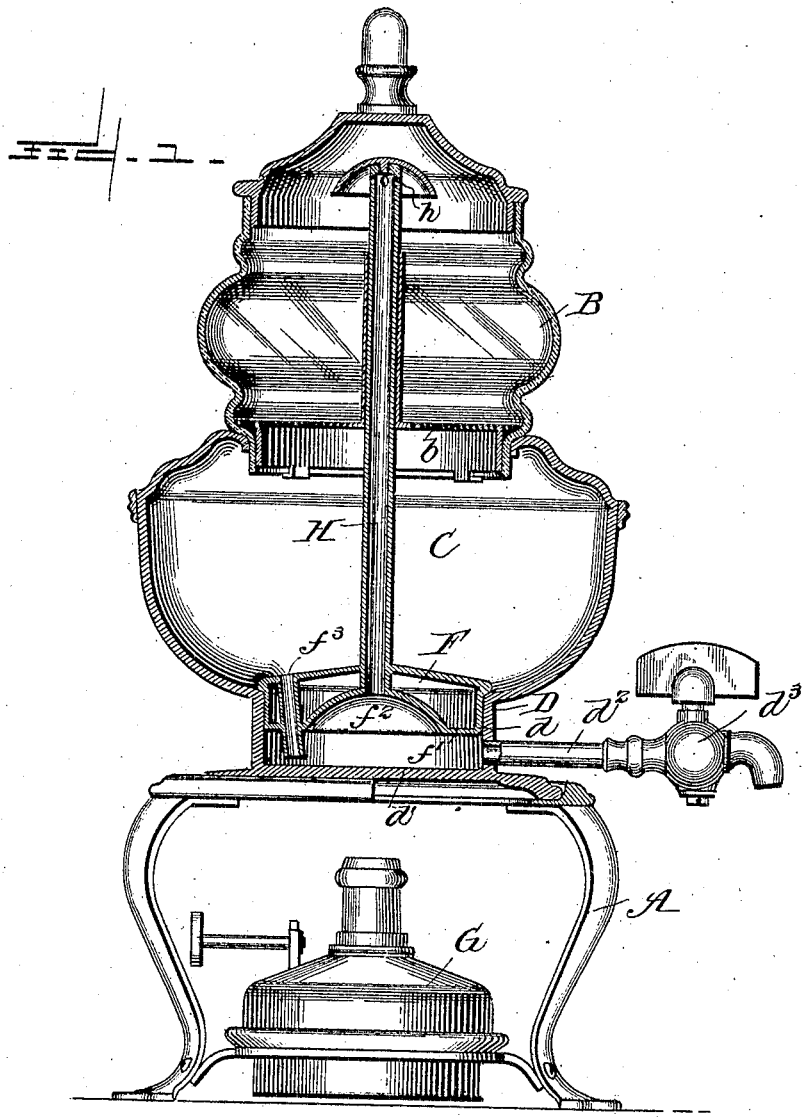
WITNESSES:
G. P. Kingsbury,
E. H. Bond
INVENTOR
Joseph Heinrichs
BY
Griffin Benchard & Cavanagh
ATTORNEYS

UNITED STATES PATENT OFFICE.

JOSEPH HEINRICHS, OF NEW YORK, N. Y.

COFFEE-URN.

No. 851,417.

Specification of Letters Patent.

Patented April 23, 1907.

Application filed January 15, 1904. Serial No. 189,137.

*To all whom it may concern:*

Be it known that I, JOSEPH HEINRICHS, a citizen of the United States, residing in the city of New York, borough of Manhattan, in the county of New York and State of New York, have invented new and useful Improvements in Coffee-Urns, of which the following is a specification.

My invention relates to coffee pots or urns of that kind which are used more especially in preparing a small quantity of beverage for immediate consumption, say one, two or more cups of after dinner coffee.

In individual coffee pots it is essential that three important factors be combined in a single unitary structure. The first condition is to overcome any tendency of the beverage to boil in order to preserve the flavor of the extract; the second is the ability to prepare a very small quantity of beverage, say one cupful, in a table pot or urn having a capacity up to prepare six cups of beverage; and the third is to enable the interior of the apparatus to be thoroughly cleansed by scouring the same. The table urn of this invention is especially constructed to secure these three advantages, and thereby produce a practical, successful and self-contained beverage-making apparatus which is economical in operation and cheap of manufacture.

My portable or table urn comprises a reservoir, a material chamber resting on said reservoir, a heating chamber of less area than the reservoir, below the same, and provided with a boundary wall which rises perpendicularly from the bottom of said heating chamber, a dome having a steam tight frictional engagement with said chamber, a feed pipe through said dome and leading from the heating chamber to the material chamber, and a return tube located within the edge of the dome and leading from the reservoir to the heating chamber. The steam-tight engagement between the dome and the wall of the heating-chamber is secured by a taper on the circumscribing wall of the dome which enables said dome to be wedged tightly into the chamber. This construction secures a two-fold function; first, the wall of the heating chamber is vertical, so as to expose the whole area of the bottom of said chamber, in order that the same may be exposed to view, and all the surfaces of the chamber are accessible easily for cleaning purposes by a scouring operation; and secondly, a steam tight connection between the dome and the chamber is secured, thus enabling a small quantity of water to be heated in the reduced bottom chamber, from which the water is lifted, by steam pressure, through the feed pipe and thence to the material chamber.

The bottom heating chamber of my urn is quite shallow and it is of the same diameter as the internal diameter of the circumscribing vertical wall, thus exposing the whole area of the bottom of the chamber and the entire inner surface of the wall.

The return tube from the reservoir to the heating chamber extends through the removable steam dome, and is located within the tapering edge of said dome, thus placing the tube out of the way and making it removable with the dome. This tube is of less diameter than the feed pipe in order to return the beverage to the bottom chamber at a rate which prevents the decoction or beverage from boiling, and the lower end of this tube extends quite close to the bottom of the heating chamber, so that it will return the beverage thereto and at the same time prevent the escape of steam from the bottom chamber into the reservoir.

Reference is to be had to the accompanying drawings, forming a part of this specification, wherein like characters of reference are used to indicate corresponding parts in both the figures.

Figure 1 is a sectional elevation, through a portable coffee pot or urn embodying my improvements. Fig. 2 is a detail perspective view of the steam dome removed from the parts of the apparatus.

A designates a suitable stand which is shown as having a seat for a heater G, herein shown as an alcohol lamp. On the upper part of this stand, directly over the heater is a liquid heating chamber D, which is shown as made in one piece with a reservoir C. The chamber D is quite shallow, and it is of less diameter than the chamber of the reservoir; in fact, the subjacent chamber D is of very small capacity as compared with the reservoir C or the material chamber B. The shallow chamber D consists of a flat bottom $d'$ and an annular circumscribing wall $d$, the latter rising perpendicularly from the bottom $d'$ and producing a chamber the mean width of which is equal to the internal diameter of said vertical wall $d$.

The reservoir C is directly above the heating chamber D, and on this reservoir is fitted the container which forms the chamber B, adapted to be charged with a suitable quantity of material from which the beverage is to be prepared. The removable container B has a foraminous bottom $b$, through which the beverage may trickle in order to accumulate in the reservoir C.

F designates a removable steam dome having wedging engagement with the annular wall $d$ of the heating chamber D, so as to secure a steam tight connection between the dome and the heating chamber. This dome is of hollow or chambered construction, and as shown by Fig. 1, it consists of a top member, a bottom member $f'$, and a circumferential wall which joins the top and bottom members, and which is made slightly conical or tapering as represented by Fig. 2, in order that the desired wedging engagement between the dome and the heating chamber may be secured. The bottom member $f'$ is provided with a central dished portion $f^2$, (see Fig. 1), and from this dished member extends the feed pipe H, said pipe passing through the dome, the reservoir C and the foraminous bottom $b$, so as to discharge the liquid into the chamber B, through suitable openings $h'$.

The steam dome F is fitted within the shallow chamber D, so that its bottom portion $f'$ is quite close to the bottom $d'$ of said heating chamber, thereby reducing the vertical dimensions of the heating chamber when the parts are assembled for use and permitting a small quantity of liquid or beverage to be contained in said heating chamber. The dished portion $f^2$ of the bottom provides the required space for the accumulation of steam in the chamber D, which steam is necessary to exert pressure on the liquid or beverage required to force said beverage through the feed pipe H, thereby discharging the liquid or beverage upon the material contained in the chamber B.

Communication between the reservoir C and the heating chamber D is established by a return tube $f^3$. This tube extends through the chambered dome, and it lies within the edge of the latter. As shown by the drawings, the tube $f^3$ is integral with the steam dome, and it is removable with said dome and insertible therewith, said return tube being out of the way and obviating any special construction of the apparatus for its accommodation. The return tube $f^3$ is of less diameter than the feed pipe H, and this tube extends below the bottom $f'$ of the dome, so as to extend into the liquid present in the chamber D, whereby the tube serves to return the liquid from the reservoir C to the chamber D at a rate which will prevent the liquid from boiling in the chamber, and at the same time the lower end of the tube will be sealed by the liquid in a way to overcome the escape of steam from said chamber D directly into the reservoir C.

The beverage may be drawn from the chamber D and through a delivery pipe $d^2$, the latter being provided with the usual stop cock $d^3$.

In the operation of my urn the material is placed in the chamber B, and a proper quantity of water is introduced in the apparatus. The lamp G having been lighted, the water in the chamber D is heated and the pressure generated therein causes the water to rise through the pipe H, from whence it is discharged upon the material in the chamber B. The water percolates through the material and passes into the reservoir C, from whence it is returned by the tube $f^3$ to the chamber D. The circulation is continued until the beverage attains the desired strength, and it is drawn off through the valved pipe $d^3$.

What I claim as new and desire to secure by Letters Patent is:—

1. In a device of the class described, a reservoir, a shallow chamber at the bottom of said reservoir, said chamber having an annular circumscribing wall, a material chamber above the reservoir, a hollow non-perforated steam dome F fitted into steam tight engagement with said annular wall of the shallow-chamber and said dome extending downwardly into said shallow chamber so as to reduce the vertical dimensions of the chamber between the bottom thereof and the bottom of the dome, the bottom of said dome having a dished steam cavity extending toward the top of said dome, a feed pipe extending from the dished cavity of the steam dome upwardly into the material chamber, and a return tube from the reservoir to the shallow chamber.

2. In a device of the class described, a reservoir, a shallow chamber having an annular wall, a material chamber above the reservoir, a non-perforated steam dome having steam-tight engagement with said annular wall and extending downwardly into the shallow chamber for reducing the vertical dimensions of the free space between the bottom of the dome and the bottom of the chamber, said steam dome comprising top and bottom plates connected by an intermediate conical wall, and said bottom plate provided with a steam cavity $f^2$, a feed tube extending upwardly from the steam cavity of said dome, and a return tube extending from the reservoir to the shallow chamber.

(Signed)      JOSEPH HEINRICHS.

Witnesses:
R. B. CAVANAGH,
H. I. BERNHARD.